(12) United States Patent
Bohn et al.

(10) Patent No.: US 8,780,570 B2
(45) Date of Patent: Jul. 15, 2014

(54) DOUBLE HINGE TORSION BAR

(75) Inventors: David D. Bohn, Fort Collins, CO (US); Paul M. O'Brien, Sammamish, WA (US); Christopher Bramley Fruhauf, San Anselmo, CA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 13/027,021

(22) Filed: Feb. 14, 2011

(65) Prior Publication Data

US 2012/0206893 A1    Aug. 16, 2012

(51) Int. Cl.
*H05K 5/00*    (2006.01)

(52) U.S. Cl.
USPC ............. 361/755; 361/679.28; 361/728

(58) Field of Classification Search
USPC ............. 361/755, 728–730, 679.16, 679.27, 361/679.28; 455/575.1–575.3, 575.7
See application file for complete search history.

(56) References Cited

U.S. PATENT DOCUMENTS

| | | |
|---|---|---|
| 4,050,116 A | 9/1977 | Salice |
| 4,949,426 A | 8/1990 | Komaki |
| 5,052,078 A | 10/1991 | Hosoi |
| 5,077,551 A | 12/1991 | Saitou |
| 5,268,816 A | 12/1993 | Abell, Jr. et al. |
| 5,335,142 A | 8/1994 | Anderson |
| 5,390,075 A | 2/1995 | English et al. |
| 5,394,297 A | 2/1995 | Toedter |
| 5,581,440 A | 12/1996 | Toedter |
| 5,661,797 A | 8/1997 | Leman et al. |
| 5,827,082 A | 10/1998 | Laine |
| 6,108,868 A | 8/2000 | Lin |
| 6,223,393 B1 | 5/2001 | Knopf |
| 6,230,365 B1 | 5/2001 | Lu |
| 6,252,767 B1 | 6/2001 | Carlson |
| 6,359,776 B2 | 3/2002 | Carlson |
| 6,388,872 B1 | 5/2002 | Liao et al. |
| 6,404,622 B1 | 6/2002 | Chen |
| 6,553,625 B2 | 4/2003 | Lin et al. |
| 6,692,275 B2 | 2/2004 | Lee |
| 6,895,638 B2 | 5/2005 | Lin |
| 7,054,147 B2 | 5/2006 | Maatta et al. |
| 7,058,433 B2 | 6/2006 | Carpenter |

(Continued)

FOREIGN PATENT DOCUMENTS

JP    06310874    11/1994

OTHER PUBLICATIONS

"Non-Final Office Action", U.S. Appl. No. 13/084,284, (Dec. 12, 2012), 20 pages.

(Continued)

*Primary Examiner* — Hung S Bui
(74) *Attorney, Agent, or Firm* — Judy Yee; Micky Minhas; Wolfe-SBMC

(57) ABSTRACT

In embodiments of a double hinge torsion bar, a portable device includes a first housing integrated with a display device, and a second housing movably coupled to the first housing. Double hinges attach to the first and second housings of the portable device, and the double hinges are operable to open and close the first and second housings relative to each other. A torsion bar movably couples the double hinges to open and close at approximately a same timing rate, which can prevent the double hinges from binding when the first and second housings are opened and closed relative to each other.

20 Claims, 4 Drawing Sheets

(56) References Cited

U.S. PATENT DOCUMENTS

| | | |
|---|---|---|
| 7,106,579 B2 | 9/2006 | Maskatia et al. |
| 7,155,266 B2 | 12/2006 | Stefansen |
| 7,155,780 B2 | 1/2007 | Chen |
| 7,266,864 B2 | 9/2007 | Kim |
| 7,299,523 B2 | 11/2007 | Zou |
| 7,374,424 B1 | 5/2008 | Nurmi et al. |
| 7,414,834 B2 | 8/2008 | Ukonaho et al. |
| 7,483,723 B2 * | 1/2009 | Soderlund .................. 455/575.1 |
| 7,484,271 B2 | 2/2009 | Oshima et al. |
| 7,515,707 B2 | 4/2009 | Ka et al. |
| 7,596,832 B2 | 10/2009 | Hsieh et al. |
| 7,688,970 B2 | 3/2010 | Garcia et al. |
| 7,719,827 B2 | 5/2010 | Mihara et al. |
| 7,729,720 B2 | 6/2010 | Suh et al. |
| 7,738,930 B2 | 6/2010 | Petrella |
| 7,787,912 B2 | 8/2010 | Saila |
| 7,787,914 B2 | 8/2010 | Ahn et al. |
| 7,898,815 B2 | 3/2011 | Tanaka et al. |
| 7,925,309 B2 | 4/2011 | Soderlund |
| 7,930,803 B2 | 4/2011 | Ueyama et al. |
| 7,933,118 B2 | 4/2011 | Chiu et al. |
| 7,974,085 B2 | 7/2011 | Ouyang |
| 8,004,833 B2 | 8/2011 | Tseng et al. |
| 8,104,144 B2 * | 1/2012 | Wang et al. ...................... 16/354 |
| 8,208,249 B2 | 6/2012 | Chin et al. |
| 8,289,688 B2 | 10/2012 | Behar et al. |
| 8,441,791 B2 | 5/2013 | Bohn et al. |
| 8,451,601 B2 | 5/2013 | Bohn |
| 2001/0003707 A1 | 6/2001 | Moriya |
| 2001/0009499 A1 | 7/2001 | Carlson |
| 2002/0069483 A1 | 6/2002 | Savolainen et al. |
| 2004/0077199 A1 | 4/2004 | Winstead et al. |
| 2004/0209641 A1 | 10/2004 | Hong |
| 2004/0212968 A1 * | 10/2004 | Lin ................................ 361/755 |
| 2004/0246667 A1 | 12/2004 | Maskatia et al. |
| 2005/0079900 A1 | 4/2005 | Li |
| 2005/0239520 A1 * | 10/2005 | Stefansen .................. 455/575.1 |
| 2006/0080805 A1 | 4/2006 | Takagi |
| 2006/0171529 A1 | 8/2006 | Iikura |
| 2006/0185122 A1 | 8/2006 | Saito et al. |
| 2006/0198513 A1 | 9/2006 | Eldon |
| 2006/0246964 A1 | 11/2006 | Castaneda et al. |
| 2007/0000088 A1 | 1/2007 | Mao et al. |
| 2007/0054710 A1 | 3/2007 | Pan |
| 2007/0107163 A1 | 5/2007 | Barnett |
| 2008/0307608 A1 | 12/2008 | Goto |
| 2009/0000062 A1 | 1/2009 | Yamanami |
| 2009/0147458 A1 | 6/2009 | Wang et al. |
| 2009/0151118 A1 | 6/2009 | Karkkola et al. |
| 2009/0156260 A1 | 6/2009 | Derengowski et al. |
| 2009/0227301 A1 | 9/2009 | Lindvall |
| 2009/0265890 A1 | 10/2009 | Endo et al. |
| 2009/0291719 A1 | 11/2009 | Christensen |
| 2010/0071155 A1 | 3/2010 | Ueyama et al. |
| 2010/0088853 A1 | 4/2010 | Degner et al. |
| 2010/0232096 A1 | 9/2010 | Chen |
| 2010/0304799 A1 | 12/2010 | Leung et al. |
| 2011/0102986 A1 | 5/2011 | Asakura et al. |
| 2011/0265288 A1 | 11/2011 | Chiang |
| 2012/0162866 A1 | 6/2012 | Bohn |
| 2012/0194972 A1 | 8/2012 | Bohn |
| 2012/0206864 A1 | 8/2012 | Bohn |
| 2012/0257368 A1 | 10/2012 | Bohn et al. |

OTHER PUBLICATIONS

"Notice of Allowance", U.S. Appl. No. 12/978,162, (Nov. 30, 2012), 12 pages.

"Notice of Allowance", U.S. Appl. No. 13/017,460, (Nov. 30, 2012), 14 pages.

Ruhfass, Michelle, "Review: Samsung's Double Jointed SCH-u740", Retrieved at << http://www.mobileburn.com/review.jsp?Id=3188 >>, Mar. 1, 2007, pp. 2.

"Fpc (Mobile Phone Flex Cable)", Retrieved from: <http://richli.en.made-in-china.com/product/FeBEzQgvHJic/China-Fpc-Mobile-Phone-Flex-Cable-.html> on Oct. 11, 2010, (2010), 1 page.

Bohn, et al., "Double Hinge Axial Claims", U.S. Appl. No. 13/017,460, (Jan. 21, 2011), pp. 1-17.

Bohn, et al., "Double Hinge Radial Claims", U.S. Appl. No. 12/978,162, (Dec. 23, 2010), pp. 1-16.

Bohn, et al., "Double Hinge Torsion Bar", U.S. Appl. No. 13/027,021, (Feb. 14, 2011), pp. 1-18.

Bohn, et al., "Hinge Electrical Interconnection Guide", U.S. Appl. No. 13/024,506, (Feb. 10, 2010), pp. 1-19.

Falcone, Joe "Microminiature Connector Solutions for Wireless Handheld Devices", Retrieved from: <http://www.ecnmag.com/Products/2009/08/Microminiature-Connector-Solutions-for-Wireless-Handheld-Devices/> on Oct. 11, 2010, (Aug. 21, 2009), 4 pages.

Kelander, Ilkka et al., "Modeling for High-Speed Interconnects in Mobile Device Hinge Structures", *In Proceedings of 2006 Electronics Technology Conference*, Available at <http://ieeexplore.ieee.org/stamp/stamp.jsp?tp=&arnumber=4060770>,(Sep. 2006), pp. 485-490.

Wattanajantra, Asavin "Fujitsu dual-touchscreen concept phone will have you feeling double", Retrieved from: <http://crave.cnet.co.uk/mobiles/fujitsu-dual-touchscreen-concept-phone-will-have-you-feeling-double-50001064/> on Oct. 8, 2010, (Oct. 7, 2010), 11 pages.

"Final Office Action", U.S. Appl. No. 13/084,284, (Apr. 12, 2013), 22 pages.

"Non-Final Office Action", U.S. Appl. No. 13/024,506, (May 2, 2013), 8 pages.

"Final Office Action", U.S. Appl. No. 13/024,506, Nov. 15, 2013, 7 pages.

"Non-Final Office Action", U.S. Appl. No. 13/084,284, Oct. 3, 2013, 28 pages.

"Foreign Office Action", CN Application No. 201210029063.0, Jan. 26, 2014, 11 Pages.

"Non-Final Office Action", U.S. Appl. No. 13/024,506, Apr. 4, 2014, 8 pages.

"Notice of Allowance", U.S. Appl. No. 13/084,284, Feb. 28, 2014, 9 pages.

* cited by examiner

DOUBLE HINGE TORSION BAR

BACKGROUND

Mobile phones and portable devices are increasingly common, and many include dual displays and/or a display device that opens and closes relative to a handheld base of a device. For example, a mobile computer device can be hinged to open two display devices, each integrated into a side or half of the device housing. However, hinge mechanisms can include relatively complex rotating hinges and hardware components to position the display screens for use, and may bind when two hinges operate independently to open the housing sections of a device. Hinge mechanisms can also be obtrusive when configured between display devices and/or may take up space that would otherwise be utilized to implement a larger display device. Users typically want the smallest possible devices to conveniently carry in a pocket or purse, but also want devices with larger display surfaces.

SUMMARY

This summary is provided to introduce simplified concepts of a double hinge torsion bar that is further described below in the Detailed Description. This summary is not intended to identify essential features of the claimed subject matter, nor is it intended for use in determining the scope of the claimed subject matter.

A double hinge torsion bar is described. In embodiments, a portable device includes a first housing integrated with a display device, and a second housing movably coupled to the first housing. Double hinges attach to the first and second housings of the portable device, and the double hinges are operable to open and close the first and second housings relative to each other. A torsion bar movably couples the double hinges to open and close at approximately a same timing rate, which can prevent the double hinges from binding when the first and second housings are opened and closed relative to each other.

In other embodiments, the double hinges each include a set of double hinge cams, and the double hinge cams can be implemented as axial cams or radial cams. The double hinges are operable with a first actuation and a second actuation to sequence opening the first and second housings of the portable device, and are further operable to reverse-sequence closing the first and second housings. The double hinges also each include a hinge link that couples a set of double hinge cams, and the torsion bar movably couples the hinge links of the double hinges. In an implementation, the torsion bar connects the hinge links of the double hinges as a pivot point through the hinge links for one of the double hinge cams in a double hinge. The torsion bar can be implemented to couple the double hinges external relative to the first and second housings of the portable device, or internal relative to the first and second housings of the portable device.

BRIEF DESCRIPTION OF THE DRAWINGS

Embodiments of a double hinge torsion bar are described with reference to the following drawings. The same numbers are used throughout the drawings to reference like features and components.

DETAILED DESCRIPTION

A double hinge torsion bar is described. In embodiments, a portable device, such as mobile phone or computer device, with two housing sections includes double hinges that each include a hinge chassis designed to attach to the housing sections of the portable device. The double hinges are movably coupled together by a torsion bar to open and close the double hinges at approximately a same timing rate to prevent the double hinges from binding when the first and second housings are opened and closed relative to each other. The torsion bar can be located internally or externally to the portable device, and keeps the double hinges moving together, such as when one hinge doesn't open or close at the same rate as the other hinge. Additionally, the torsion bar adds stability to a double hinge assembly in a portable device that includes independent components, such as the hinges and housing sections of the device. The torsion bar couples the double hinges to form a double hinge assembly that stabilizes the double hinges and keeps the timing to open and close the double hinges together.

While features and concepts of the described systems and methods for a double hinge torsion bar can be implemented in any number of different environments, systems, devices, and/or various configurations, embodiments of a double hinge torsion bar are described in the context of the following example devices, systems, and configurations.

Figure 1:
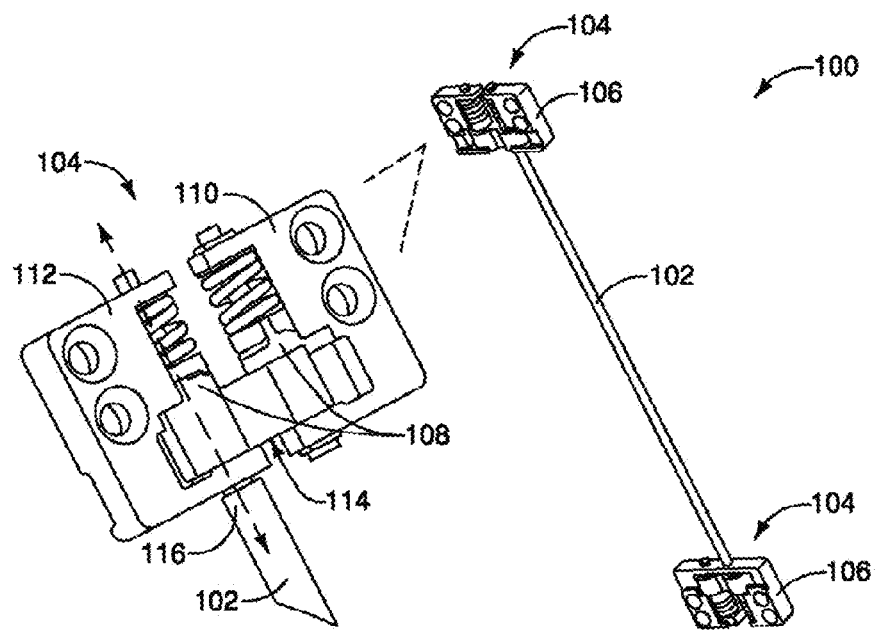
FIG. 1 illustrates an example of a double hinge assembly that includes a torsion bar coupled to double hinges with axial cams in accordance with one or more embodiments.

FIG. 1 illustrates an example of a double hinge assembly 100 that includes a torsion bar 102 coupled to double hinges 104 with axial cams in accordance with one or more embodiments. The double hinge assembly can be implemented in any type of portable device, such as a mobile phone or laptop computer, that is designed to open and close. For example, a portable device may include two housing sections that are attached to a hinge chassis 106 of the double hinges, which are operable to open and close a first housing of a device relative to a second housing of the device. The housing sections of the portable device can be rotated from a closed position at approximately zero degrees (0°) to an open position at approximately one-hundred and eighty degrees (180°) with the double hinges. The double hinges may also be implemented to rotate the housing sections of the portable device approximately three-hundred and sixty degrees (360°) relative to each other.

In this example, the hinge chassis 106 of the double hinges 104 includes a set of axial cams 108 that are further described with reference to FIG. 3. The hinge chassis of the double hinges is shown in an open position and has a first half 110 and a second half 112, both designed to attach to the housing sections of a portable device. The double hinges are both operable for a first actuation and a second actuation to sequence opening the first and second housings of the portable device, and are further operable to reverse-sequence closing the first and second housings of the portable device.

The double hinges 104 each include a hinge link 114 that couples the set of axial cams 108 in the hinge chassis. The torsion bar 102 couples the first double hinge to the second double hinge and is implemented to open and close the double hinges at approximately a same timing rate to prevent the double hinges from binding when the housing sections of a portable device are opened and closed relative to each other. In embodiments, the torsion bar couples to the hinge links of the double hinges, and may be connected to any part of the hinge links. For example, the torsion bar can be implemented as a pivot point at 116 through the hinge links of the double hinges for one of the axial cams in the set of axial cams for a double hinge.

Figure 2:
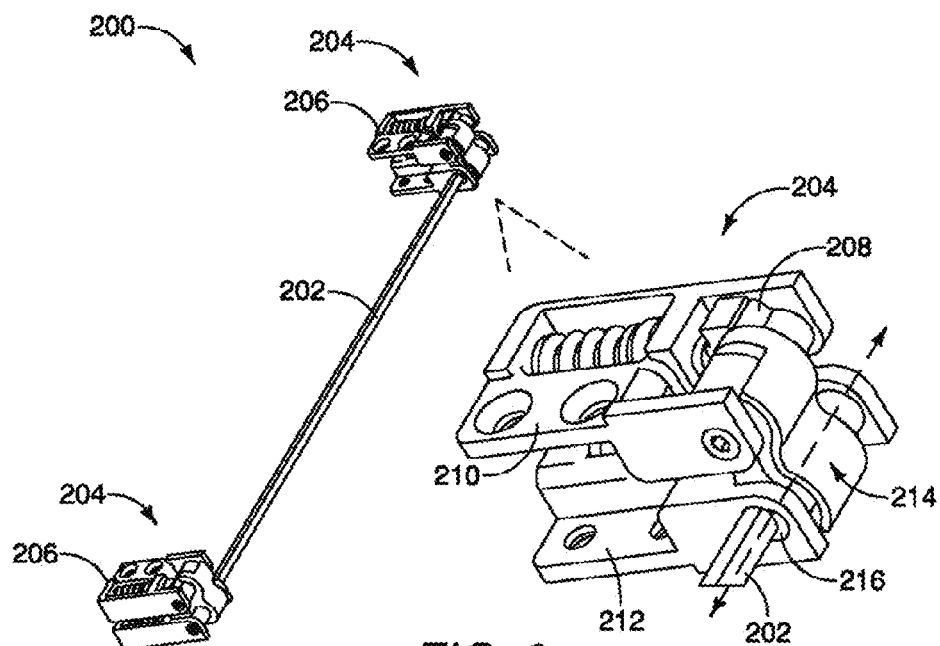
FIG. 2 illustrates another example of a double hinge assembly that includes a torsion bar coupled to double hinges with radial cams in accordance with one or more embodiments.

FIG. 2 illustrates another example of a double hinge assembly 200 that includes a torsion bar 202 coupled to double hinges 204 with radial cams in accordance with one or more embodiments. As described above, the double hinge assembly can be implemented in any type of portable device, such as a mobile phone or laptop computer, that is designed to open and close. For example, a portable device may include two housing sections that are attached to a hinge chassis 206 of the double hinges, which are operable to open and close a first housing of a device relative to a second housing of the device.

In this example, the hinge chassis 206 of the double hinges 204 includes a set of radial cams 208 that are further described with reference to FIG. 4. The hinge chassis of the double hinges is shown in a closed position and has a first half 210 and a second half 212, both designed to attach to the housing sections of a portable device. The double hinges are both operable for a first actuation and a second actuation to sequence opening the first and second housings of the portable device, and are further operable to reverse-sequence closing the first and second housings of the portable device.

The double hinges 204 each include a hinge link 214 that couples the set of radial cams 208 in the hinge chassis. The torsion bar 202 couples the first double hinge to the second double hinge and is implemented to open and close the double hinges at approximately a same timing rate to prevent the double hinges from binding when the housing sections of a portable device are opened and closed relative to each other. In embodiments, the torsion bar couples to the hinge links of the double hinges, and may be connected to any part of the hinge links. For example, the torsion bar can be implemented as a pivot point at 216 through the hinge links of the double hinges for one of the radial cams in the set of radial cams for a double hinge.

Figure 3:
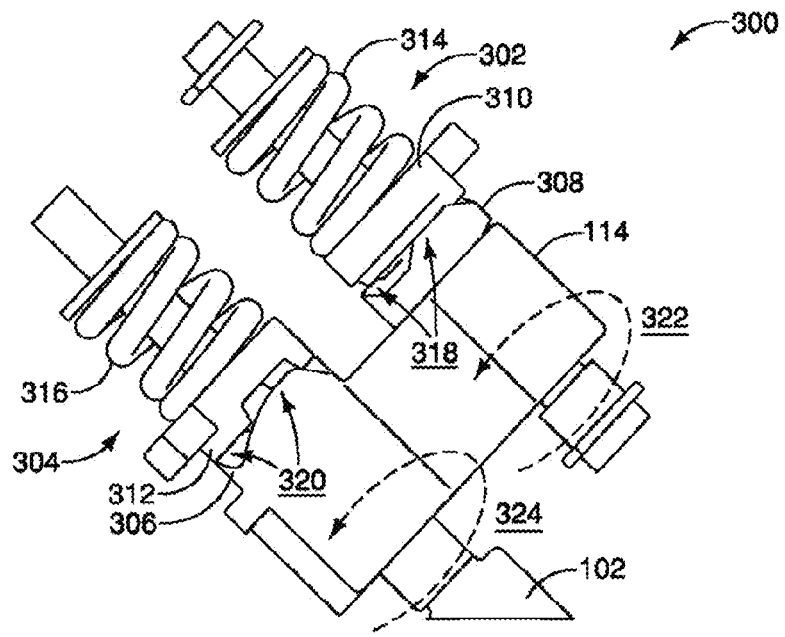
FIG. 3 illustrates an example of the double hinge axial cams as described with reference to FIG. 1 in accordance with one or more embodiments.

FIG. 3 illustrates an example 300 of the double hinge axial cams described with reference to FIG. 1. The double hinge axial cams include the torsion bar 102 and the hinge link 114, as well as two cam-and-follower mechanisms 302, 304. The hinge link has an integrated cam 306 (e.g., molded or constructed as an integral component of the hinge link), and has a removable cam 308 (e.g., keyed to lock in position relative to the hinge link when installed). The first cam-and-follower mechanism 302 includes a cam follower 310 and the removable cam 308. Similarly, the second cam-and-follower mechanism 304 includes a cam follower 312 and the integrated cam 306. The first cam-and-follower mechanism 302 also includes a tensioner spring 314, and the second cam-and-follower mechanism 304 includes a tensioner spring 316. The tensioner springs apply a force to push the respective cam followers against cam lobes of the corresponding axial cams. The cam followers 310, 312 have stops that hold them in a fixed position relative to the respective cams 308, 306 as the hinge link rotates.

The removable cam 308 has cam lobes 318 that actuate against the first cam follower 310. Similarly, the integrated cam 306 has cam lobes 320 that actuate against the second cam follower 312. In an implementation, each of the cams are balanced with three cam lobes evenly spaced every one-hundred and twenty degrees (120°). A force vector having a force and a direction of the force is created where a cam lobe contacts a cam follower, and the shape of the cam and the cam follower change the force vector and the applied torque. In an alternate embodiment, the double hinge can be implemented as a friction hinge, and the cam-and-follower mechanisms are operable to actuate based on friction between a cam and a cam follower.

The torsion bar 102 couples the hinge link 114 to a second hinge link (not shown), such as when two of the double hinge axial cams are installed in a portable device (e.g., on opposite ends or sides of the portable device). The double hinge can be implemented as a bistable hinge mechanism that is operable with a first actuation at 322 and a second actuation at 324 to sequence closing, and is then operable to reverse-sequence when opening.

The first cam-and-follower mechanism 302 closes the first half of the double hinge (e.g., at 322) with less applied torque before the second cam-and-follower mechanism 304 closes the second half of the double hinge (e.g., at 324). The first cam-and-follower mechanism 302 also opens the first half of the double hinge with less applied torque before the second cam-and-follower mechanism 304 opens the second half of the double hinge. In an implementation, a cam face of the first cam follower 310 is a different shape than the second cam follower 312, and the shape difference of the cam face is operable on the removable cam 308 to apply less torque.

Figure 4:
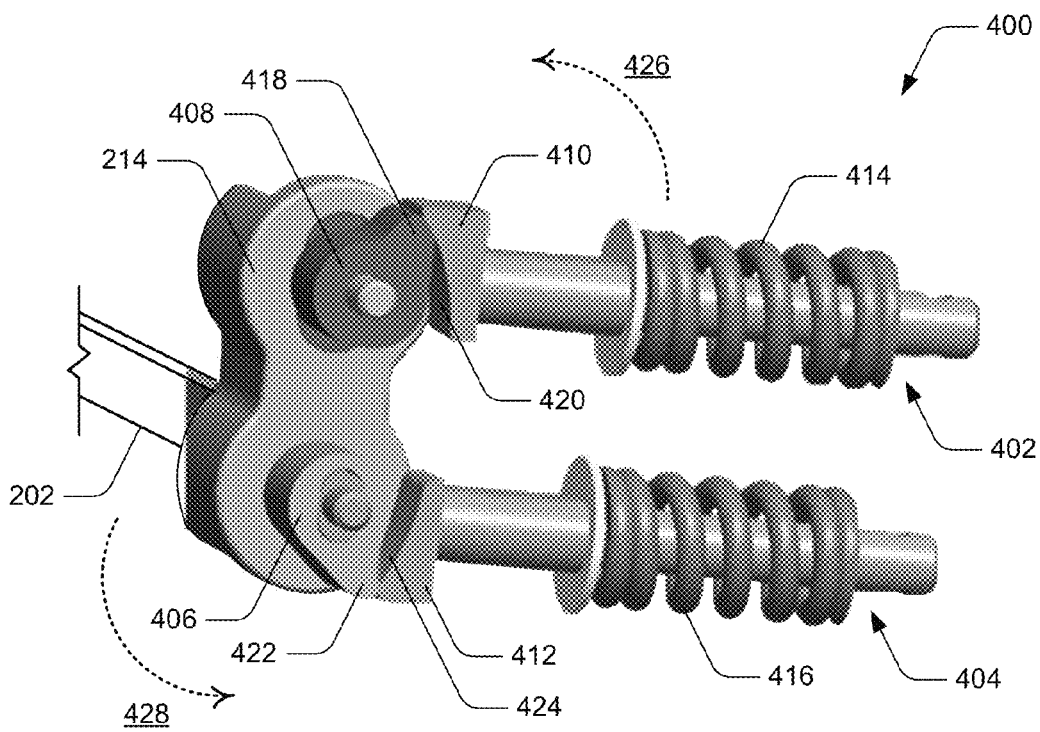
FIG. 4 illustrates an example of the double hinge radial cams as described with reference to FIG. 2 in accordance with one or more embodiments.

FIG. 4 illustrates an example 400 of the double hinge radial cams described with reference to FIG. 2. The double hinge radial cams include the torsion bar 202 and the hinge link 214, as well as two cam-and-follower mechanisms 402, 404. The hinge link has an integrated cam 406 (e.g., molded or constructed as an integral component of the hinge link), and has a removable cam 408. The first cam-and-follower mechanism 402 includes a cam follower 410 and the removable cam 408. Similarly, the second cam-and-follower mechanism 404 includes a cam follower 412 and the integrated cam 406. The first cam-and-follower mechanism 402 also includes a tensioner spring 414, and the second cam-and-follower mechanism 404 includes a tensioner spring 416. The tensioner springs push the respective cam followers against cam lobes of the corresponding the radial cams.

The removable cam 408 has a cam lobe 418 that actuates against a cam face 420 the first cam follower 410. Similarly, the integrated cam 406 has a cam lobe 422 that actuates against a cam face 424 of the second cam follower 412. A force vector having a force and a direction of the force is created where a cam lobe contacts a cam face of a cam follower, and the shape of the cam and the cam follower change the force vector and the applied torque. In an alternate embodiment, the double hinge can be implemented as a friction hinge, and the cam-and-follower mechanisms are operable to actuate based on friction between a cam and a cam face of a cam follower.

The torsion bar 202 couples the hinge link 214 to a second hinge link (not shown), such as when two of the double hinge radial cams are installed in a portable device (e.g., on opposite ends or sides of the portable device). The double hinge can be implemented as a bistable hinge mechanism that is operable with a first actuation at 426 and a second actuation at 428 to sequence opening, and is then operable to reverse-sequence when closing.

The first cam-and-follower mechanism 402 opens the first half of the double hinge (e.g., at 426) with less applied torque before the second cam-and-follower mechanism 404 opens the second half of the double hinge (e.g., at 428). The first cam-and-follower mechanism 402 also closes the first half of the double hinge with less applied torque before the second cam-and-follower mechanism 404 closes the second half of the double hinge. In an implementation, the cam face 420 of the first cam follower 410 is a different shape than the second cam follower 412, and the shape difference of the cam face 420 is operable on the cam 408 to apply less torque.

Figure 5:
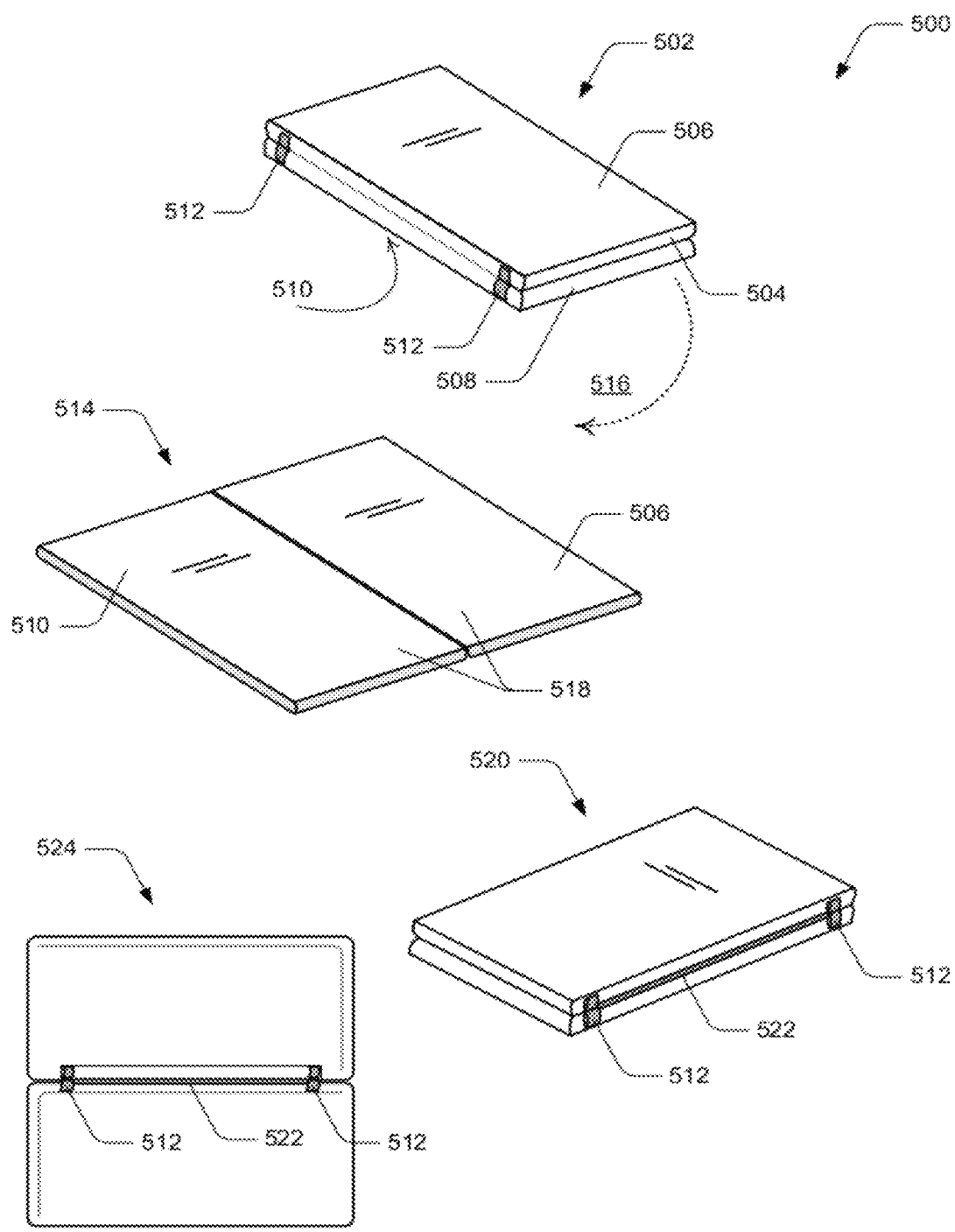
FIG. 5 illustrates examples of a portable device implemented with a double hinge torsion bar in accordance with one or more embodiments.

FIG. 5 illustrates examples of a portable device 500 that can be implemented to include double hinges and a torsion bar in accordance with embodiments described herein. In embodiments, the portable device may be any form of a consumer, computer, user, communication, phone, navigation, television, appliance, gaming, media playback, and/or electronic device. In a first view 502, the portable device is shown in a closed position. The portable device has a first housing 504 with an integrated display device 506, and also has a second housing 508 that may include a physical keyboard or an additional display device 510 (e.g., on the underside of the portable device as shown in this example). Correspondingly, the display devices are viewable from opposite sides of the portable device in the closed position of the first and second housings (also referred to herein as an anti-book mode).

The first housing 504 is movably coupled to the second housing 508 by the double hinges 512, installed in the device between the display devices and operable to open from the closed position at approximately zero degrees (0°) to an open position at approximately one-hundred and eighty degrees (180°), as well as rotated through approximately three-hundred and sixty degrees (360°). In a second view 514, the portable device 500 is shown in an open position, such as when the second housing 508 is rotated around and up at 516 to position the display device 506 and the additional display device 510 adjacent each other to form a surface display 518 (e.g., the two display devices appear as one larger display surface). In the open position, the double hinges are not visible, and are designed to allow the display devices coming together in the open position.

In embodiments, the torsion bar couples together the double hinges either external relative to the first and second housings of the portable device, or internal relative to the first and second housings of the portable device. For example, in the first view 502, the torsion bar is internal in the portable device (e.g., the torsion bar is not shown or visible when the portable device is closed). In a third view 520, the portable device is shown in a closed position and the double hinges 512 are coupled by the torsion bar 522, which is shown external to the housings of the portable device. In a fourth view 524, the portable device is shown in an open position and the double hinges 512 are coupled by the torsion bar 522, which is shown external to the housings of the portable device.

Figure 6:
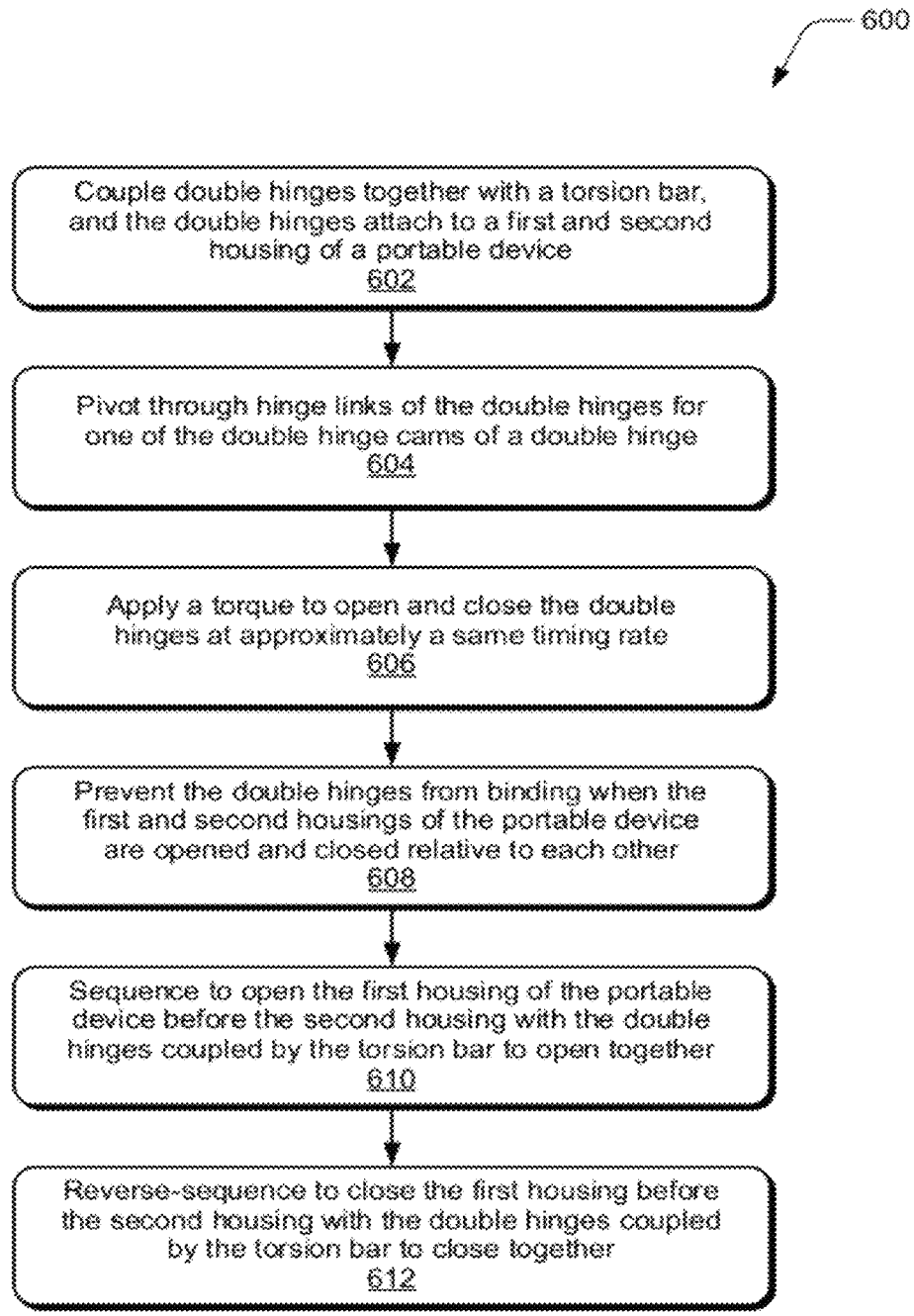
FIG. 6 illustrates example method(s) of a double hinge torsion bar in accordance with one or more embodiments.

FIG. 6 illustrates example method(s) 600 of a double hinge torsion bar. The order in which the method blocks are described are not intended to be construed as a limitation, and any number of the described method blocks can be combined in any order to implement a method, or an alternate method.

At block 602, double hinges are coupled together with a torsion bar, and the double hinges attach to a first and second housing of a portable device. For example, the double hinge assembly 100 (FIG. 1) includes the torsion bar 102 that movably couples the double hinges 104, and the hinge chassis 106 of each double hinge is designed to attach to housing sections of a portable device. The double hinges 104 each include a set of axial cams and a hinge link 114 that couples the axial cams in the hinge chassis. Similarly, the double hinge assembly 200 (FIG. 2) includes the torsion bar 202 that movably couples the double hinges 204, and the hinge chassis 206 of each double hinge is designed to attach to housing sections of a portable device. The double hinges 204 each include a set of radial cams and a hinge link 214 that couples the radial cams in the hinge chassis. The double hinges 104, 204 are operable to open and close the housing sections of the portable device relative to each other, such as with a first actuation to open a first housing of the portable device before a second housing, and with a second actuation to close the first housing of the portable device before the second housing.

At block 604, the torsion bar pivots through hinge links of the double hinges for one of the double hinge cams of a double hinge. For example, a double hinge 104 includes the hinge link 114 that couples the set of axial cams 108, and the torsion bar 102 is a pivot point at 116 through the hinge links of the double hinges for one of the axial cams in the set of axial cams for a double hinge. Similarly, a double hinge 204 includes the hinge link 214 that couples the set of radial cams 208, and the torsion bar 202 is a pivot point at 216 through the hinge links of the double hinges for one of the radial cams in the set of radial cams for a double hinge.

At block 606, a torque is applied to open and close the double hinges at approximately a same timing rate and, at block 608, the double hinges are prevented from binding when the first and second housings of the portable device are opened and closed relative to each other. For example, the torsion bar 102 is implemented to open and close the double hinges 104 (with the axial cams) at approximately a same timing rate to prevent the double hinges from binding when the housing sections of a portable device are opened and closed relative to each other. Similarly, the torsion bar 202 is implemented to open and close the double hinges 204 (with the radial cams) at approximately a same timing rate to prevent the double hinges from binding when the housing sections of a portable device are opened and closed relative to each other.

At block 610, the first housing of the portable device is opened in a sequence before the second housing with the double hinges coupled by the torsion bar to open together. For example, the axial cams of the double hinges 104 that are coupled by the torsion bar 102 are operable to open the first housing of the portable device in a sequence before the second housing. Similarly, the radial cams of the double hinges 204 that are coupled by the torsion bar 202 are operable to open the first housing of the portable device in a sequence before the second housing.

At block 612, the first housing of the portable device is closed in a reverse-sequence before the second housing with the double hinges coupled by the torsion bar to close together. For example, the axial cams of the double hinges 104 that are coupled by the torsion bar 102 are operable to close the first housing of the portable device in a reverse-sequence before the second housing. Similarly, the radial cams of the double hinges 204 that are coupled by the torsion bar 202 are operable to close the first housing of the portable device in a reverse-sequence before the second housing.

Although embodiments of a double hinge torsion bar have been described in language specific to features and/or methods, the subject of the appended claims is not necessarily limited to the specific features or methods described. Rather, the specific features and methods are disclosed as example implementations of a double hinge torsion bar.

The invention claimed is:

1. A double hinge assembly, comprising:
   a first double hinge that includes a first hinge chassis configured for attachment to a first housing of a portable device and a second housing of the portable device;
   a second double hinge that includes a second hinge chassis configured for attachment to the first and second housings of the portable device, the first and second double hinges operable to open and close the first and second housings of the portable device relative to each other; and
   a torsion bar configured to couple the first double hinge to the second double hinge and further configured to open and close the first and second double hinges at approximately a same timing rate.

2. The double hinge assembly as recited in claim 1, wherein the torsion bar is further configured to prevent the first and second double hinges from binding when the first and second housings of the portable device are opened and closed relative to each other.

3. The double hinge assembly as recited in claim 1, wherein the first and second double hinges both include a set of double hinge cams, and wherein the double hinge cams comprise axial cams or radial cams.

4. The double hinge assembly as recited in claim 3, wherein the first and second double hinges both include a hinge link configured to couple the set of double hinge cams, and wherein the torsion bar is further configured to couple the hinge link of the first double hinge to the hinge link of the second double hinge.

5. The double hinge assembly as recited in claim 4, wherein the torsion bar is further configured as a pivot point through the hinge links of the first and second double hinges for one of the double hinge cams in the respective sets of double hinge cams.

6. The double hinge assembly as recited in claim 1, wherein the first and second double hinges are both operable for a first actuation and a second actuation to sequence opening the first and second housings of the portable device, and are further operable to reverse sequence closing the first and second housings of the portable device.

7. The double hinge assembly as recited in claim 1, wherein the torsion bar is further configured to couple the first and second double hinges external relative to the first and second housings of the portable device, or internal relative to the first and second housings of the portable device.

8. A portable device comprising:
   a display device;
   a first housing integrated with the display device;
   a second housing movably coupled to the first housing;
   a first double hinge that includes a first hinge chassis attached to the first housing and the second housing;
   a second double hinge that includes a second hinge chassis attached to the first and second housings, the first and second double hinges operable to open and close the first and second housings of the portable device relative to each other; and
   a torsion bar coupling the first double hinge to the second double hinge and configured to open and close the first and second double hinges at approximately a same timing rate.

9. The portable device as recited in claim 8, wherein the torsion bar is further configured to prevent the first and second double hinges from binding when the first and second housings of the portable device are opened and closed relative to each other.

10. The portable device as recited in claim 8, wherein the first and second double hinges both include a set of double hinge cams, and wherein the double hinge cams comprise axial cams or radial cams.

11. The portable device as recited in claim 10, wherein the first and second double hinges both include a hinge link coupling the set of double hinge cams, and wherein the torsion bar further couples the hinge link of the first double hinge to the hinge link of the second double hinge.

12. The portable device as recited in claim 11, wherein the torsion bar further acts as a pivot point through the hinge links of the first and second double hinges for one of the double hinge cams in the respective sets of double hinge cams.

13. The portable device as recited in claim 8, wherein the first and second double hinges are both operable for a first actuation and a second actuation to sequence opening the first and second housings of the portable device, and are further operable to reverse sequence closing the first and second housings of the portable device.

14. The portable device as recited in claim 8, wherein the torsion bar further couples the first and second double hinges external relative to the first and second housings of the portable device, or internal relative to the first and second housings of the portable device.

15. A method comprising:
   providing a portable device having display device, the display device having a first housing integrated with the display device and a second housing movably coupled to the first housing;
   attaching a first double hinge that includes a first hinge chassis to the first housing and the second housing;
   attaching a second double hinge that includes a second hinge chassis to the first and second housings, the first and second double hinges operable to open and close the first and second housings of the portable device relative to each other; and
   coupling the first double hinge to the second double hinge using a torsion bar configured to open and close the first and second double hinges at approximately a same timing rate.

16. The method as recited in claim 15, wherein the torsion bar is configured to prevent the first and second double hinges from binding when the first and second housings of the portable device are opened and closed relative to each other.

17. The method as recited in claim 15, wherein the first and second double hinges both include a set of double hinge cams, and wherein the double hinge cams comprise axial cams or radial cams.

18. The method as recited in claim 17, wherein the first and second double hinges both include a hinge link coupling the set of double hinge cams, and wherein the torsion bar further couples the hinge link of the first double hinge to the hinge link of the second double hinge.

19. The method as recited in claim 18, wherein the torsion bar further acts as a pivot point through the hinge links of the first and second double hinges for one of the double hinge cams in the respective sets of double hinge cams.

20. The method as recited in claim 15, wherein the first and second double hinges are both operable for a first actuation and a second actuation to sequence opening the first and second housings of the portable device, and are further operable to reverse sequence closing the first and second housings of the portable device.

* * * * *